United States Patent [19]
Tiedeman et al.

[11] Patent Number: 5,860,606
[45] Date of Patent: *Jan. 19, 1999

[54] CHIPPER/SHREDDER HAVING ROTATABLE FEED CHUTE

[75] Inventors: David A. Tiedeman, Jackson; Charles S. Henninger, Humboldt, both of Tenn.

[73] Assignee: Murray Outdoor Products, Inc., Brentwood, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 71,570

[22] Filed: Jun. 3, 1993

[51] Int. Cl.⁶ .................................................. B02C 13/10
[52] U.S. Cl. ........................ 241/55; 241/58; 241/101.78; 241/285.2; 241/285.3
[58] Field of Search ................................. 241/92, 55, 56, 241/58, 101.7, 285.2, 285.3; 56/13.1, 13.2, DIG. 8

[56] References Cited

U.S. PATENT DOCUMENTS

| | | | |
|---|---|---|---|
| 385,990 | 7/1888 | Baugh . | |
| 2,658,318 | 11/1953 | Miller . | |
| 3,338,037 | 8/1967 | Bauer et al. . | |
| 3,618,157 | 11/1971 | Bassin | 15/330 |
| 3,688,479 | 9/1972 | Martinson et al. | 56/13.2 |
| 3,813,725 | 6/1974 | Rinker | 15/347 |
| 3,817,462 | 6/1974 | Hamlin | 241/101.7 |
| 3,841,571 | 10/1974 | Dankel et al. | 241/101.7 |
| 3,860,181 | 1/1975 | Enters et al. | 241/55 |
| 3,907,216 | 9/1975 | MacKissie et al. | 241/152 A |
| 3,929,236 | 12/1975 | Koturov | 241/55 |
| 3,968,938 | 7/1976 | Ruhl et al. | 241/101.1 |
| 4,117,983 | 10/1978 | Browning | 241/55 |
| 4,824,034 | 4/1989 | Baker | 241/101.2 |
| 4,826,331 | 5/1989 | Baker | 384/145 |
| 4,834,302 | 5/1989 | Baker | 241/92 |
| 4,911,564 | 3/1990 | Baker | 384/145 |
| 4,951,882 | 8/1990 | Ober | 241/55 |
| 5,018,672 | 5/1991 | Peck et al. | 241/37.5 |
| 5,062,329 | 11/1991 | Connolly et al. | 81/488 |
| 5,085,376 | 2/1992 | Litchenburg | 241/56 |
| 5,156,345 | 10/1992 | Baker | 241/56 |
| 5,240,189 | 8/1993 | Majkrzak et al. | 241/55 |
| 5,340,035 | 8/1994 | Ford | 241/55 |
| B1 5,340,035 | 6/1997 | Ford | 241/55 |

Primary Examiner—John M. Husar
Attorney, Agent, or Firm—Pillsbury Madison & Sutro LLP

[57] ABSTRACT

A chipper/shredder for comminuting debris such as leaves, twigs, branches and the like, comprising a housing having at least one inlet for receiving such debris, cutting elements disposed within the housing, an engine operatively coupled to the cutting elements for selectively moving said cutting elements to comminute the debris, and a first feed chute attached to a first side of the housing and communicating with the inlet, wherein the feed chute is selectively rotatable between upright and lowered positions, rotation of the chute being about an axis substantially perpendicular to the plane defined by the first side of the housing. The housing preferably includes a second inlet on the opposite side of the first feed chute, with a second feed chute fixedly secured thereto for introducing larger debris into the interior of the housing for comminuting. The first feed chute is normally locked in its upright position, but may be moved to its lowered position by pulling a knob which disengages a plunger from a plate rotatable with the chute mounted adjacent the inlet. With the first feed chute in its lowered position, leaves and other debris may be introduced into the comminuting chamber. In the preferred embodiment the engine is an internal combustion engine having a drive shaft extending into the housing and coupled to the cutting elements, and the first feed chute rotates about an axis co-linear with the drive shaft.

11 Claims, 4 Drawing Sheets

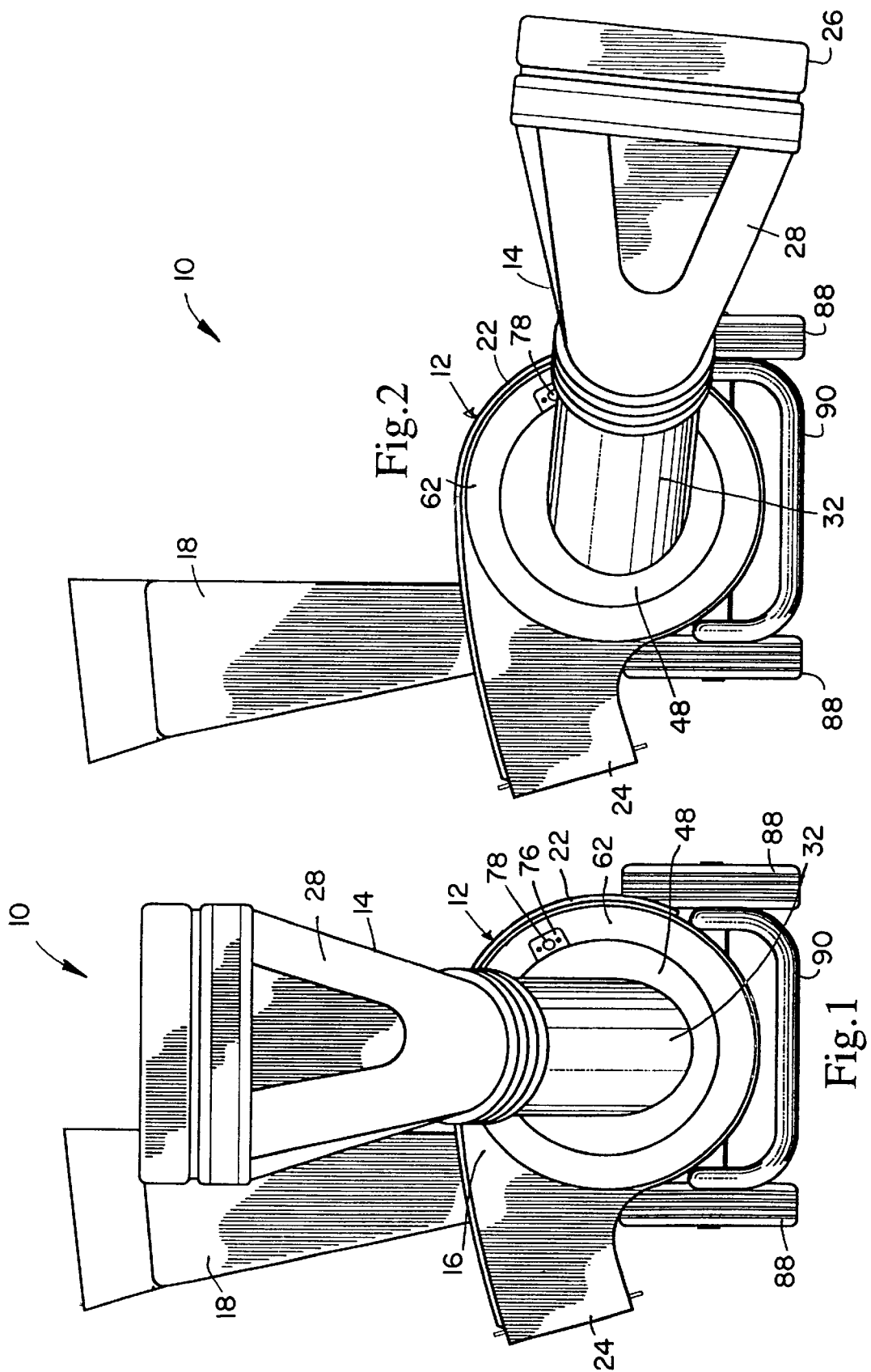

5,860,606

CHIPPER/SHREDDER HAVING ROTATABLE FEED CHUTE

BACKGROUND OF THE INVENTION

1. Field

The present invention relates generally to apparatus for comminuting leaves, twigs, branches and similar debris, and, in particular, to a chipper/shredder having a rotatable feed chute selectively movable between upright and lowered positions.

2. Description of the Prior Art

Chipper/shredders are well known lawn care and garden implements used to comminute debris such as leaves, twigs, branches, etc. Typical portable chipper/shredders comprise a generally circular housing attached to a frame, with an electric or gasoline powered engine attached thereto for driving a plurality of cutting elements disposed within the housing. The housing typically includes at least one feed chute attached thereto for introducing debris through an inlet in the side of the housing into the interior, whereupon the cutting elements comminute the debris to small particle suitable for use as mulch or for disposal. Ordinarily, a pair of such feed chutes are provided on opposite sides of the housing, with one feed chute being adapted for larger debris such as branches and small tree limbs, and the other chute being better suited for introducing smaller debris such as leaves and twigs into the housing. Also, it is common for the feed chute adapted to receive leaves and other small debris to have an enlarged receptacle or hopper at its distal end to facilitate introduction of such debris in relatively large quantities.

It has been found desirable for the hopper to be selectively positionable between an upright position, whereupon debris may be inserted vertically from above, and a lowered position, whereupon debris may be raked or swept horizontally directly into the hopper. One such apparatus is shown in U.S. Pat. No. 3,817,462, issued Jun. 18, 1974 to Hamlin, which discloses a chute 16 having hinged sidewalls 16A movable between raised and lowered positions. The Hamlin apparatus enables the user to rake or sweep debris directly into the housing, but the configuration of the chute is irregular and does not provide an efficient passageway for introduction of the debris. Additionally, the Hamlin design is unacceptably complex and expensive, since the hopper and hinged chute are separate components. Accordingly, a need has been recognized for a simplified chipper/shredder, or similar comminuting apparatus, having a feed chute selectively movable between upright and lowered positions which performs equally well in either position.

BRIEF SUMMARY OF THE INVENTION

It is an object of the present invention to provide an improved chipper/shredder or similar comminuting apparatus having a feed chute selectively movable between upright and lowered positions. Another object is to provide such apparatus in which performance is unaffected by the position of the feed chute.

In order to achieve these and other objects, the present invention comprises a portable chipper/shredder having a housing with first and second generally planar parallel sides bounded by a peripheral outer wall, defining an open interior which serves as the comminuting chamber for reducing debris such as leaves, twigs, branches, and the like, to a usable or disposable form. The first wall has an inlet formed therein for receiving debris into the interior, and the outer wall has an outlet formed therein for discharging comminuted debris. Cutting means are disposed within the interior, operative to comminute the debris, and an internal combustion engine or other suitable driving means are operatively coupled to the cutting means for selectively rotating the cutting means within the housing. A first feed chute is attached to the first side of the housing in communication with the inlet, providing a passageway through which debris may be introduced into the interior for comminuting by the cutting means. The feed chute is selectively rotatable between upright and lowered positions, rotation of the chute being about an axis substantially perpendicular to the plane defined by the first side of the housing and, preferably, about the axis of rotation for the cutting means.

The above stated and other objects will become apparent upon reading the following detailed description in conjunction with the appended drawings.

BRIEF DESCRIPTION OF THE DRAWINGS

FIG. 1 is a front elevational view of a chipper/shredder embodying the principles of the present invention, shown with the feed chute in its upright position;

FIG. 2 is a front elevational view similar to FIG. 1, showing the feed chute in its lowered position;

DETAILED DESCRIPTION OF THE PREFERRED EMBODIMENT

Figure 3:
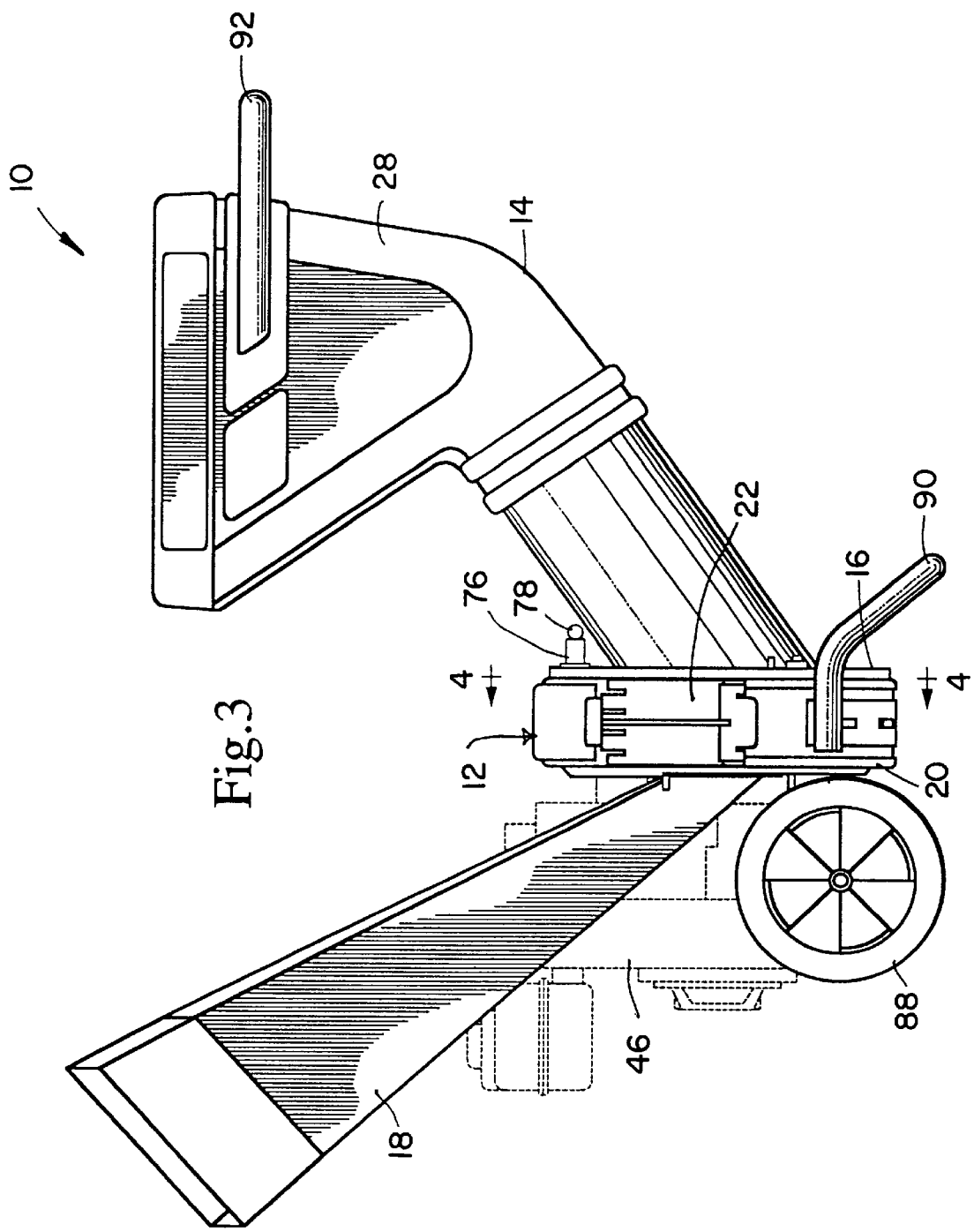
FIG. 3 is a side elevational view of the chipper/shredder shown in FIG. 1.

This invention relates to a comminuting apparatus commonly known as a "chipper/shredder." Referring initially to FIGS. 1–3, the chipper/shredder of this invention is identified generally as apparatus 10, comprising a housing 12 having a feed chute 14 rotatably secured to the front side 16, and a chipper chute 18 fixedly secured to the rear side 20. Housing 12 is bounded by a peripheral outer wall 22, and includes an outlet 24 through which comminuted debris is discharged, preferably into a suitable container. As those skilled in the art will readily appreciate, the primary novelty of this invention is found in the rotating ability of feed chute 14, described more fully below.

Feed chute 14 is uniquely rotatable between an upright position, as shown in FIG. 1, and a lowered position as shown in FIG. 2. In the lowered position, the edge portion 26 of hopper 28 is substantially level with the ground, so that the user of apparatus 10 can easily rake or sweep leaves or other debris to be comminuted directly into hopper 28. Such debris is then introduced into interior 30 of housing 12 through cylindrical section 32 which communicates with interior 30 through in an inlet opening formed in front side 16. In the upright position, hopper 28 is positioned to receive debris vertically from above, with cylindrical section 32 extending angularly upwardly from side 16. It is seen that the angle of entry of cylindrical section 32 relative to front side 16 remains unchanged regardless of whether chute 14 is in its upright or lowered position.

Figure 4:
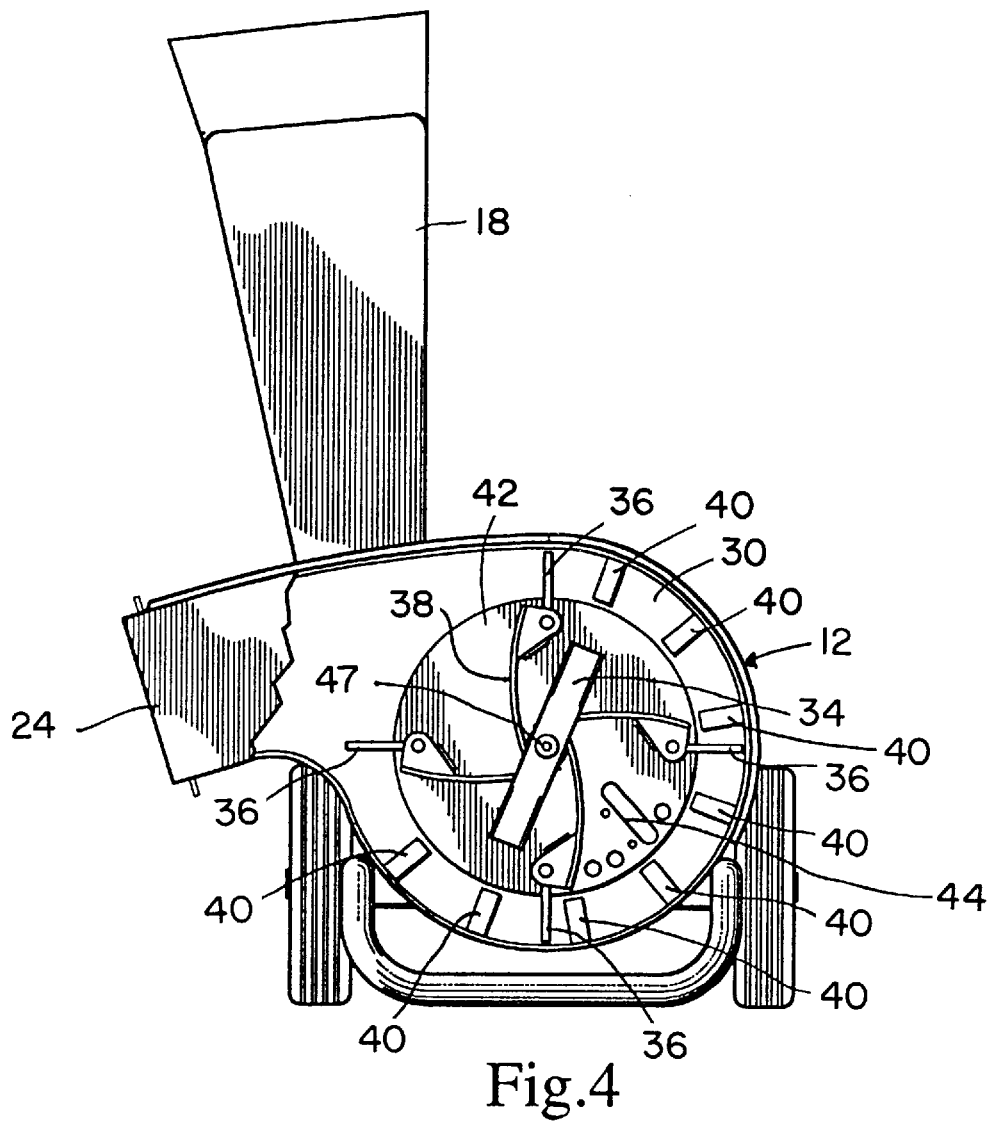
FIG. 4 is a side sectional view taken along line 4—4 of FIG. 3.

As shown in FIG. 4, apparatus 10 includes a variety of cutting means disposed within housing 12 for adequately comminuting debris. Initially, blade 34 contacts debris introduced through chute 14, thereby reducing the debris to an acceptable size for further comminuting by flails 36 hingedly secured to rotating structure 38. Preferably, flails 36 are disposed in groups of three, adapted to fit between stationary blades 40 projecting inwardly from outer wall 22. For larger debris introduced through chipper chute 18, flywheel 42 includes chipper blade 44 which serves to reduce limbs and branches to smaller particles suitable for comminuting by flails 36 and stationary blades 40. The cutting means defined by blade 34, rotating structure 38, and flywheel 42 are rotatably driven at a relatively high speed by internal combustion engine 46, which is operatively coupled to such cutting means by drive shaft 47 extending from engine 46 through rear side 20 of housing 12. It is expected that those skilled in the art will readily understand the operation of the cutting means and engine 46 disclosed herein, and that any suitable cutting means and driving means operatively coupled thereto may be incorporated on apparatus 10 without departing from the principles of the present invention.

Figure 5:
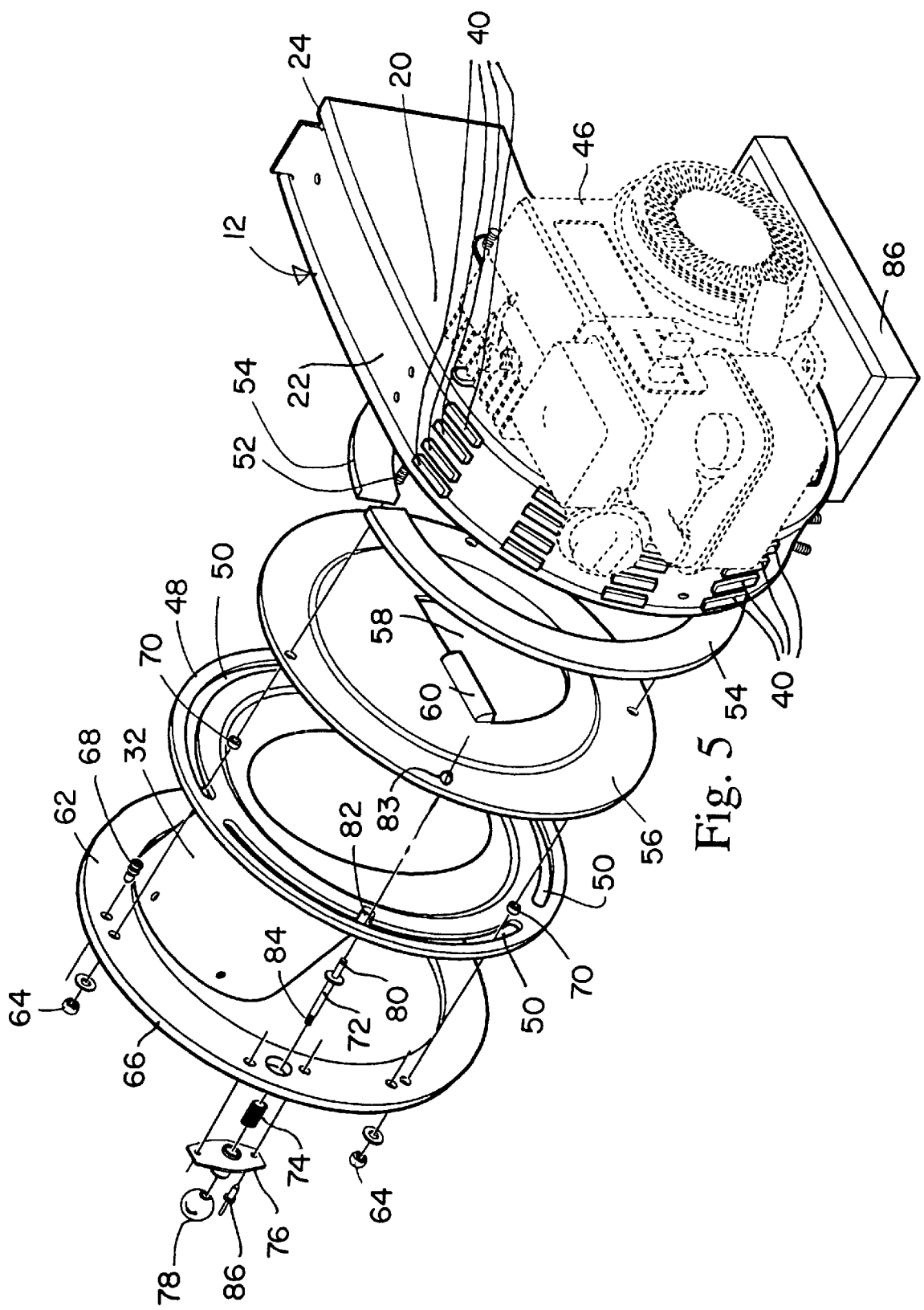
FIG. 5 is an exploded perspective view of the feed chute mounting and rotating assembly of this invention.

In FIG. 5, the preferred structural components are shown for enabling selective rotation of chute 14 between its upright and lowered positions, as mentioned above. Cylindrical section 32 of chute 14 is shown having annular plate 48 secured to or integrally formed with the proximate end thereof. Plate 48 has a plurality of arcuate slots 50 formed therein through which studs 52 are inserted for securing plate 50 to front side 16 of housing 12. Disposed between plate 48 and front side 16 are seals 54 and restricting plate 56, with plate 56 having an opening 58 formed therein for allowing the introduction of debris through the passageway defined by cylindrical section 32 and the inlet in front side 16 into interior 30 of housing 12. Opening 58 has offset 60 associated therewith for cooperating with blade 34 to initially reduce the debris to smaller particles. Finally, outer stationary ring 62 is secured onto studs 52 by means of nuts 64, thereby retaining plate 48, plate 56, and seals 54 against side 16 of housing 12.

The unique rotating ability of chute 14 is provided by the structure best illustrated in FIG. 5. As described above, plate 56 and ring 62 are fixedly secured to the front side 16 of housing 12, with plate 48 being disposed therebetween. Studs 52 (only one of which is shown) are alignable with suitable mounting holes formed in plate 56 and ring 62, and with slots 50 in plate 48. Preferably, plate 56 and ring 62 each include three such mounting holes formed therein for aligning with three studs 52. Ring 62 preferably includes an annular lip 66 which fits over the outer perimeter of plates 48 and 56 and seals 54, and abuts side 16 annularly adjacent the circular inlet opening formed therein. Annular lip 66 thereby prevents the compressive load caused upon tightening nuts 64 from prohibiting rotational movement of plate 48 and cylindrical section 32 secured thereto. At least one grease fitting 68 is provided in stationary ring 62 so that the rotational assembly may be lubricated. Preferably, three such grease fittings 68 are provided. Each stud 52 preferably includes a bushing 70 disposed thereon, with bushings 70 being disposed within slots 50 to facilitate the sliding movement of studs 52 within slots 50.

Chute 14 is secured in its upright position by a locking mechanism comprising plunger 72, spring 74, retainer 76, and knob 78. Distal end 80 of plunger 72 fits within recess 82 formed in plate 48 adjacent slot 50, while proximate end 84 has external threads formed thereon for mating with internal threads formed within knob 78. Retainer 76 is secured to stationary ring 62 by a pair of rivets 86 (only one of which is shown). With chute 14 in its upright position, plate 48 is oriented such that compression spring 74 extends plunger 72 so that distal end 80 fits within recess 82 and into hole 83 in plate 56, and thereby preventing rotational movement of plate 48. When it is desired to move chute 14 to its lowered position, the user simply pulls outwardly on knob 78, thereby retracting distal end 80 of plunger 72 from hole 83 in plate 56 and recess 82, and allowing free rotational movement of plate 48. Upon returning chute 14 to its upright position, spring 74 causes plunger 72 to automatically extend to its locked position operatively engaging recess 82 and hole 83.

It has been found that the passageway into the housing inlet defined by cylindrical section 32 provides an extremely efficient structure for introducing debris into the comminuting chamber of housing 12, particularly when angularly oriented as shown herein. Apparatus 10 has been found highly effective in drawing debris into housing 12 for comminuting, and it is believe that the size and shape of cylindrical section 32 contribute to the superior performance achieved with apparatus 10. Therefore, it is highly desirable to maintain the orientation of cylindrical section 32 relative to housing 12 when chute 14 is in either the upright or lowered position. This advantage has been achieved by the unique rotational assembly of the present invention, as described herein, which allows chute 14 to be rotated about an axis substantially parallel to, or preferably co-linear with, drive shaft 47, said axis being generally perpendicular to the plane defined by front side 16. The superior performance achieved by apparatus 10 is therefore unaffected by the position of chute 14.

As with most contemporary chipper/shredders, apparatus 10 is fully portable. Housing 12 and engine 46 are mounted to a frame 86, which includes a pair of wheels 88 and support brace 90 operatively secured thereto. Hopper 28 includes a handle 92 affixed thereto which may be grasped by the user and, upon tilting apparatus 10 rearwardly so that support brace 90 is elevated slightly, pushed or pulled to move apparatus 10 as desired.

While the principles of an improved comminuting apparatus having a unique rotating feed chute have been made clear from the above detailed description, taken in conjunction with the appended drawings, it is expected that numerous variations may be made in the preferred embodiment without departing from the spirit and scope of this invention. Accordingly, the scope provided by this patent is to be limited only by the following claims in view of the relevant prior art.

What is claimed is:

1. Apparatus for comminuting debris such as leaves, twigs, branches, and the like, comprising:

a housing, including first and second generally planar parallel sides bounded by a peripheral outer wall defining an open interior, said first side having an inlet formed therein for receiving debris into said interior, said outer wall having an outlet formed therein for discharging said debris;

cutting means disposed within said interior of said housing, operative to comminute said debris;

driving means operatively coupled to said cutting means for selectively moving at least a portion of said cutting means, thereby comminuting said debris placed within said housing; and a first feed chute attached to said first side of said housing and communicating with said inlet, providing a passageway through which said debris may be introduced into said interior for comminuting by said cutting means, said first feed chute comprising:

a. a cylindrical member defining said passageway into said inlet, said cylindrical member having longitudinally opposed first and second ends;

b. an annular plate fixedly secured to said first end of said cylindrical member, having an opening formed therein for providing communication between said cylindrical member and said inlet, said plate being rotatably secured to said first side of said housing, whereupon selective rotation of said plate relative to said housing effects rotation of said chute between said upright and lowered positions; and c. an enlarged receptacle secured to said second end of said cylindrical member for receiving said debris to be comminuted, said receptacle having an opening through which said debris is introduced into the receptacle, the opening being partially defined by an elongated edge portion, wherein said cylindrical member extends upwardly at an acute angle relative to said plate when said chute is in said upright position, said receptacle being positioned to receive said debris vertically; and said cylindrical member extends substantially laterally at an acute angle relative to said plate when said chute is in said lowered position, said opening lying substantially in a vertical plane with said edge portion being located substantially at ground level whereby said receptacle is positioned to receive said debris horizontally; and wherein said feed chute is selectively rotatable between upright and lowered portions, rotation of said chute being about an axis substantially perpendicular to the plane defined by said first side of said housing.

2. Comminuting apparatus as set forth in claim 1, wherein:

said driving means comprise an internal combustion engine secured to said housing, having a drive shaft extending therefrom through said second side of said housing into said interior, said shaft being operatively coupled to said cutting means.

3. Comminuting apparatus as set forth in claim 1, wherein:

said cutting means comprise a plurality of flails having distal and proximate ends with said proximate ends being hingedly secured to a rotating member, said rotating member being operatively coupled to said driving means and rotatably driven within said housing, whereupon said flails become oriented radially outwardly upon rotation of said rotating member with said distal ends approaching said peripheral wall, and are operative to comminute said debris.

4. Comminuting apparatus as set forth in claim 3, wherein:

said cutting means further comprise a plurality of stationary blades fixedly secured to said peripheral outer wall and projecting inwardly into said interior, said stationary blades cooperating with said flails to further comminute said debris.

5. Comminuting apparatus as set forth in claim 3, wherein said cutting means further comprise:

a blade operatively coupled to said driving means and rotatably driven thereby, said blade being disposed adjacent said first inlet and operative to engage said debris introduced through said passageway and reduce at least a portion of said debris to particles suitably sized for further comminuting by said flails.

6. Comminuting apparatus as set forth in claim 5, wherein:

said blade is further operative to increase airflow into said housing through said feed chute, thereby assisting the introduction of debris into said housing and the discharge of said debris through said outlet.

7. Comminuting apparatus as set forth in claim 1, wherein:

said driving means include a drive shaft extending horizontally through said second side of said housing into said interior, said drive shaft being coupled to said cutting means for effecting rotational movement thereof; and said annular plate is rotatable about an axis substantially parallel to said drive shaft.

8. Comminuting apparatus as set forth in claim 1, wherein:

said driving means include a drive shaft extending horizontally through said second side of said housing into said interior, said drive shaft being coupled to said cutting means for effecting rotational movement thereof; and said annular plate is rotatable about an axis substantially co-linear with said drive shaft.

9. Comminuting apparatus as set forth in claim 8, wherein:

said cutting means comprise a plurality of flails having distal and proximate ends with said proximate ends being hingedly secured to a rotating member, said rotating member being operatively coupled to said driving means and rotatably driven within said housing, whereupon said flails become oriented radially outwardly upon rotation of said rotating member, with said distal ends approaching said peripheral wall and cooperating therewith to comminute said debris.

10. Comminuting apparatus as set forth in claim 9, wherein:

said cutting means further comprise a flywheel operatively coupled to said driving means and rotatably driven thereby, said flywheel being disposed adjacent said second side and having a chipping blade associated therewith, said chipping blade being operative to engage said items of debris introduced into said interior through said second feed chute and reduce said items to particles suitably sized for further comminuting by said flails.

11. Comminuting apparatus as set forth in claim 1, further comprising:

a second feed chute fixedly secured to said second side of said housing and communicating with said interior through an inlet formed in said second side, said second feed chute being adapted to receive relatively large items of said debris and introduce said items into said interior.

* * * * *